(12) United States Patent
Lee

(10) Patent No.: US 7,352,962 B2
(45) Date of Patent: Apr. 1, 2008

(54) LENS BARREL APPARATUS FOR CAMERA

(75) Inventor: Seung-bong Lee, Busan Metropolitan (KR)

(73) Assignee: Samsung Techwin Co., Ltd., Changwon (KR)

( * ) Notice: Subject to any disclaimer, the term of this patent is extended or adjusted under 35 U.S.C. 154(b) by 364 days.

(21) Appl. No.: 11/129,008

(22) Filed: May 13, 2005

(65) Prior Publication Data

US 2006/0093342 A1    May 4, 2006

(30) Foreign Application Priority Data

Nov. 4, 2004    (KR) ............... 10-2004-0089204

(51) Int. Cl.
  G03B 17/00    (2006.01)
  G03B 3/00     (2006.01)
  G03B 13/18    (2006.01)
  H04N 5/232    (2006.01)
  G02B 7/02     (2006.01)

(52) U.S. Cl. ............... 396/79; 396/89; 348/211.7; 359/819; 359/822; 359/823; 359/824

(58) Field of Classification Search ............... 396/79, 396/427, 428, 89; 348/373–375, 211.7, 211.1; 359/819, 822–824, 664, 644, 211.7; 353/7

See application file for complete search history.

(56) References Cited

U.S. PATENT DOCUMENTS 4,855,838 A * 8/1989 Jones et al. .................. 348/84
5,579,071 A * 11/1996 Wetzel et al. ............... 396/428
5,946,127 A * 8/1999 Nagata ....................... 359/280
6,141,034 A * 10/2000 McCutchen .................. 348/36
6,262,768 B1 * 7/2001 Williams ................... 348/217.1
6,639,625 B1 * 10/2003 Ishida et al. ............. 348/218.1
6,734,914 B1 * 5/2004 Nishimura et al. ......... 348/375
2002/0085844 A1 * 7/2002 Tashiro et al. .............. 396/427
2004/0119876 A1    6/2004 Ohmori et al.

* cited by examiner

Primary Examiner—Melissa Jan Koval
(74) Attorney, Agent, or Firm—Drinker Biddle & Reath LLP

(57) ABSTRACT

An apparatus for a camera with a lens barrel and a barrel driving unit. The apparatus includes an eye-shaped lens barrel, a vertical driving unit, a horizontal driving unit, a rotation-position sensing unit, a coordinate input unit, and a controller. The vertical driving unit rotates the eye-shaped lens barrel about a vertical axis in response to a vertical rotation control signal. The horizontal driving unit rotates the eye-shaped lens barrel about a horizontal axis in response to a horizontal rotation control signal. The rotation-position sensing unit generates a rotation-position data in response to the rotation of the eye-shaped lens barrel. The coordinate input unit generates an input coordinate data according to a manipulating action of a user. The controller generates the vertical rotation control signal and the horizontal rotation control signal according to the input coordinate data and the rotation-position data.

17 Claims, 5 Drawing Sheets

LENS BARREL APPARATUS FOR CAMERA

CROSS-REFERENCE TO RELATED PATENT APPLICATION

This application claims the benefit of Korean Patent Application No. 10-2004-0089204, filed on Nov. 4, 2004, in the Korean Intellectual Property Office, the disclosure of which is incorporated herein in its entirety by reference.

BACKGROUND OF THE INVENTION

1. Field of the Invention

The present invention relates to a lens barrel apparatus for a camera, and more particularly, to a lens barrel apparatus with a lens barrel and a barrel driving unit.

2. Description of the Related Art

Cameras are provided with a fixed type lens barrel. Such a camera is disclosed in U.S. Patent Application Publication No. 2004/0119876, filed on Dec. 9, 2003, and entitled "Method of Notification of Inadequate Picture Quality."

However, the fixed type lens barrel has disadvantages. It can be inconvenient for the user to have to change his/her position and posture in order to direct the camera lens toward a target object. Further, when the camera is used in a self-timer mode, it can be hard for the user to position the camera with its lens pointing in a desired direction.

SUMMARY OF THE INVENTION

The present invention provides an apparatus for a camera, in which a camera lens is directed toward a target object by means of an automatic lens barrel directing mechanism, such that a user does not need to change his/her position and posture, while taking a photograph, in order to direct the camera lens toward the object to be photographed.

The present invention also provides an apparatus for a camera, in which a camera lens is directed toward an object to be photographed by means of a mechanism that minimizes the need for the user to specially position the camera in order to direct the camera lens to the target object when taking the picture in the self-timer mode.

According to an aspect of the present invention, there is provided an apparatus for a camera, including: an eye-shaped lens barrel; a vertical driving unit rotating the eye-shaped lens barrel about a vertical axis in response to a vertical rotation control signal; a horizontal driving unit rotating the eye-shaped lens barrel about a horizontal axis in response to a horizontal rotation control signal; a rotation-position sensing unit generating rotation-position data for the eye-shaped lens barrel in response to the rotation of the eye-shaped lens barrel; a coordinate input unit generating input coordinate data according to a manipulating action of a user; and a controller generating the vertical rotation control signal and the horizontal rotation control signal according to the input coordinate data from the coordinate input unit and the rotation-position data from the rotation-position sensing unit.

According to the present invention, the user can rotate the eye-shaped lens barrel about the vertical and horizontal axes by manipulating the joystick of the coordinate input unit. Therefore, the user does not need to change his/her position and posture in order to direct the camera lens toward a target object. Further, when taking a picture in the self-timer mode, the present invention minimizes the need for the user to specially position the camera to direct the camera lens toward a target object.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
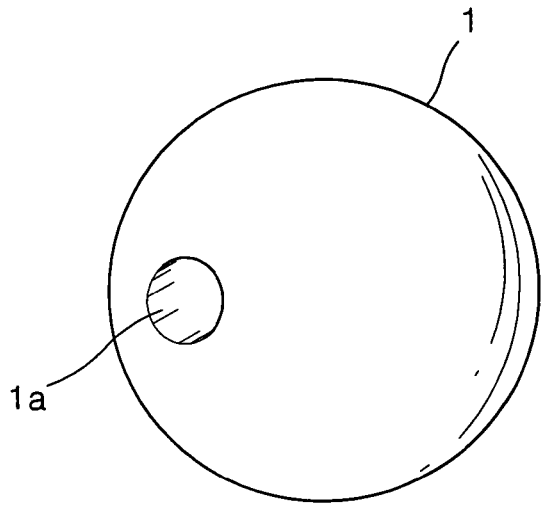
FIG. 1 is a perspective view of an eye-shaped lens barrel of a lens barrel apparatus for a camera according to present invention.
Figure 2:
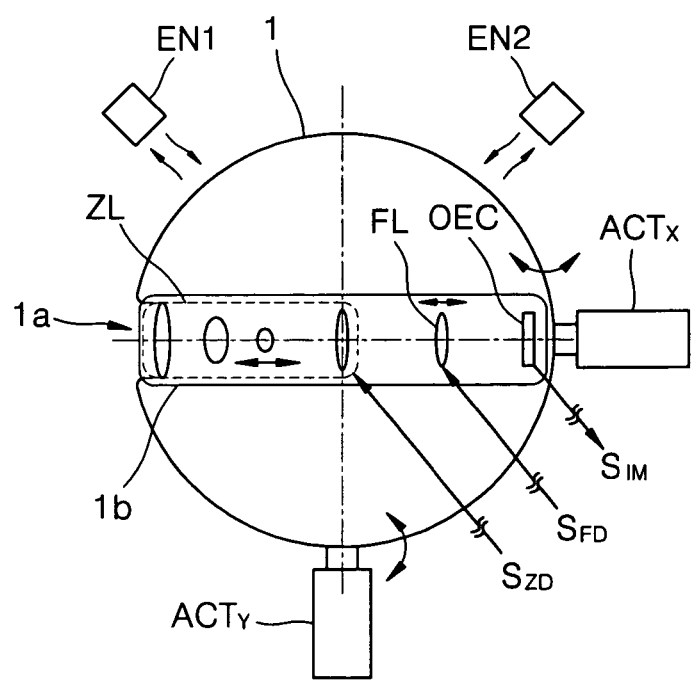
FIG. 2 is a schematic view of an eye-shaped lens barrel of FIG. 1, encoders, and actuators that are disposed in a lens barrel apparatus for a camera according to the present invention.

FIG. 1 is a perspective view of an eye-shaped lens barrel of an apparatus for a camera according to the present invention, and FIG. 2 is a schematic view of the eye-shaped lens barrel of FIG. 1, encoders, and actuators that are located in the apparatus for a camera according to the present invention.

Referring to FIGS. 1 and 2, an eye-shaped lens barrel 1 includes a hole 1a and a cylindrical internal barrel 1b. In the cylindrical internal barrel 1b, a zoom lens ZL, a focus lens FL, and an optoelectric converter OEC are located. The zoom lens ZL slides in response to a zoom control signal $S_{ZD}$ of a micro-controller. The focus lens FL slides in response to a focus control signal $S_{FD}$ of the micro-controller. The optoelectric converter OEC of a charge coupled device (CCD) or a complementary metal-oxide-semiconductor (CMOS) is provided to convert light from the focus lens FL into an electric analog signal $S_{IM}$.

A vertical axis actuator $ACT_Y$ rotates the eye-shaped lens barrel 1 about a vertical axis, and a horizontal axis actuator $ACT_X$ rotates the eye-shaped lens barrel 1 about a horizontal axis. Friction-type small actuators with a piezo-electric element may be used for the vertical axis actuator $ACT_Y$ and horizontal axis actuator $ACT_X$ (refer to Nanomotion company's products). Encoders EN1 and EN2 generate analog signals in response to the rotation of the lens barrel 1.

Figure 3:
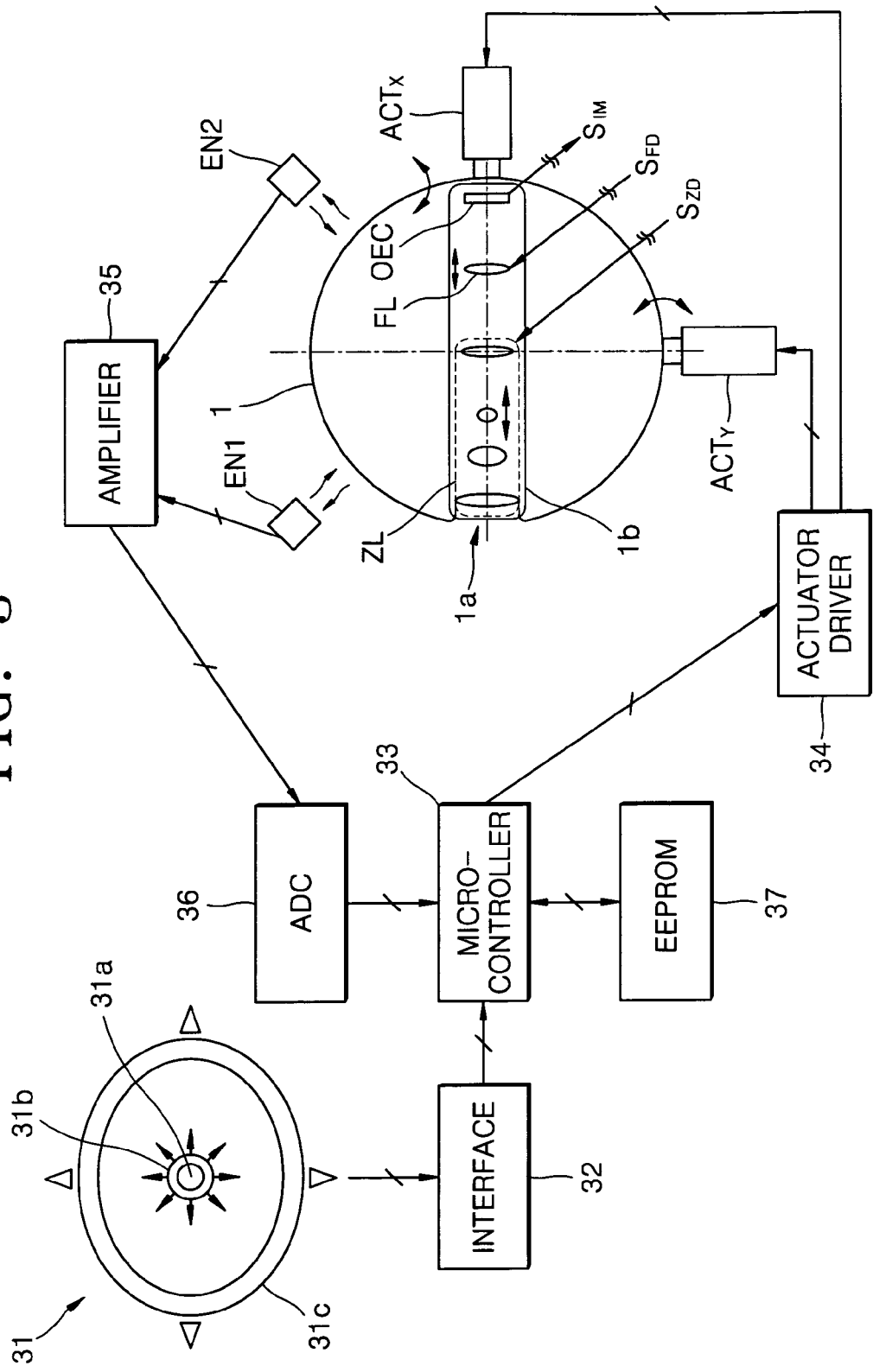
FIG. 3 is a block diagram showing an overall structure of a lens barrel apparatus for a camera according to the present invention.
Figure 4:
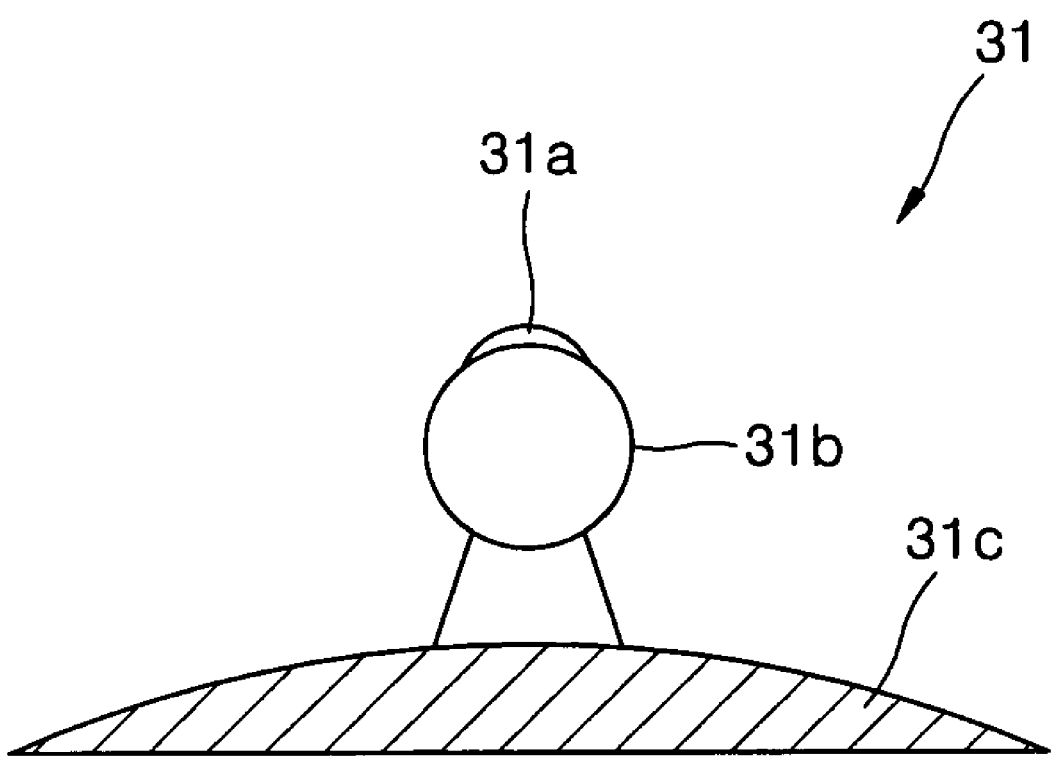
FIG. 4 is a side cut-away view of a joystick depicted in FIG. 3.

FIG. 3 is a block diagram showing an overall structure of a lens barrel apparatus for a camera according to the present invention, and FIG. 4 is a side cut-away view of a joystick depicted in FIG. 3.

Referring to FIGS. 3 and 4, the lens barrel apparatus includes the eye-shaped lens barrel 1, a vertical driving unit 34/$ACT_Y$, a horizontal driving unit 34/$ACT_X$, a rotation-position sensing unit EN1/EN2/35/36, a coordinate input unit 31/32, a micro-controller 33 as a controller, and an electrically erasable and programmable read only memory (EEPROM) 37. The vertical driving unit 34/$ACT_Y$ rotates the eye-shaped lens barrel 1 about a vertical axis in response to a vertical rotation control signal, and the horizontal driving unit 34/$ACT_X$ rotates the eye-shaped lens barrel 1 about a horizontal axis in response to a horizontal rotation control signal. The rotation-position sensing unit EN1/EN2/35/36 generates rotation-position data of the eye-shaped barrel 1 in response to the rotation of the eye-shaped lens barrel 1. The coordinate input unit 31/32 generates input coordinate data according to the user's manipulation. The micro-controller 33 generates the vertical rotation control signal and the horizontal rotation control signals according to the input coordinate data from the coordinate input unit 31/32 and the rotation-position data from the rotation-position sensing unit EN1/EN2/35/36. The vertical and horizontal rotation control signals are sent to the vertical and horizontal driving units, respectively. The EEPROM 37 stores for the micro-controller 33 the movement traces and movement velocities related to a specific position such as a reset position.

The lens barrel apparatus is designed such that the user can rotate the eye-shaped lens barrel about the vertical and horizontal axes by manipulating the joystick 31. Therefore, the user does not need to change his/her position and posture in order to direct the camera lens toward a target object. Also, it minimizes the need for the user to specially position the camera in order to direct its lens toward a target object when taking a picture in a self-timer mode.

The vertical driving unit 34/$ACT_Y$ includes the vertical axis actuator $ACT_Y$ and an actuator driver 34. The actuator driver 34 receives the vertical-rotation control signal from the micro-controller 33 to drive the vertical axis actuator $ACT_Y$. The vertical axis actuator $ACT_Y$ rotates the eye-shaped lens barrel 1 about the vertical axis.

Similarly, the horizontal driving unit 34/$ACT_X$ includes the horizontal axis actuator $ACT_X$ and the actuator driver 34. The actuator driver 34 receives the horizontal rotation control signal from the micro-controller 33 to drive the horizontal axis actuator $ACT_X$. The horizontal axis actuator $ACT_X$ rotates the eye-shaped lens barrel 1 about the horizontal axis.

The rotation-position sensing unit EN1/EN2/35/36 includes an analog-to-digital converter (ADC) 36, an amplifier 35, and the encoders EN1 and EN2. In the rotation-position sensing unit EN1/EN2/35/36, the encoders EN1 and EN2 generate analog signals in response to the rotation of the eye-shaped lens barrel 1, the amplifier 35 amplifies the analog signals of the encoders EN1 and EN2, and the analog-to-digital converter ADC 36 converts the amplified analog signals into digital signals to attain the rotation-position data.

The coordinate input unit 31/32 includes a joystick 31 and an interface 32. The joystick 31 includes a base 31c, a handle 31b, and a reset button 31a. The interface 32 generates the input coordinate data in response to the manipulation of the joystick 31. When the reset button 31a is pressed, the micro-controller 33 loads the movement traces and movement velocities information from the EEPROM 37, and then generates and sends the appropriate vertical and horizontal rotation control signals to the respective vertical and horizontal driving units to enable the actuator driver 34 move the eye-shaped lens barrel 1 to its reset position.

Figure 5:
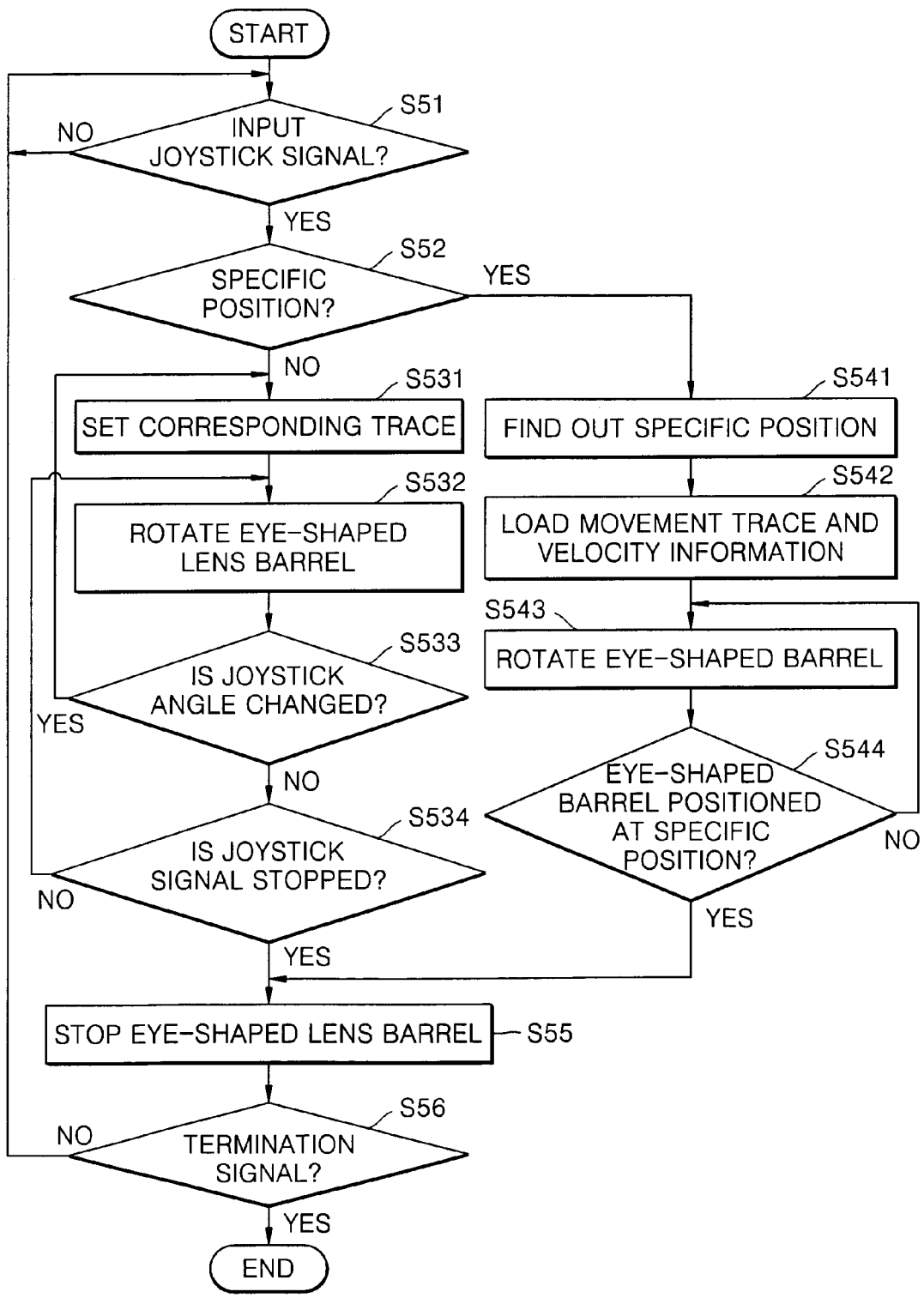
FIG. 5 is a flowchart showing a control algorithm of a micro-controller depicted in FIG. 3.

The control algorithm of the micro-controller 33 will now be described with reference to the FIGS. 3 and 5.

In operation S51, when the user manipulates the joystick 31, the interface 32 generates a joystick signal and sends the joystick signal to the micro-controller 33. In operation S52, the micro-controller 33 determines whether the joystick signal indicates a specific position, for example, a reset position.

If the joystick signal does not indicate a specific position, the operation goes to operation S531.

In operation S531, the micro-controller 33 sets a movement trace corresponding to the joystick angle, i.e., current movement azimuth of the joystick 31. In operation S532, the micro-controller 33 sends a signal to the driving units such that the actuator driver 34 rotates the eye-shaped lens barrel 1 along the set movement trace. Herein, the micro-controller 33 controls the actuator driver 34 according to rotation-position data from the analog-to-digital converter 36, so that difference between rotation amounts of vertical and horizontal axes of the eye-shaped lens barrel 1 does not exceed a limit.

In operation S533, the micro-controller 33 determines whether the joystick angle, i.e., current movement azimuth of the joystick 31 is changed. If so, the micro-controller 33 goes back to operations S531.

In operation S534, the micro-controller 33 determines whether the joystick signal input is stopped. If so, the micro-controller 33 goes to next operation S55. In operation S55, the micro-controller 33 terminates the operation of the actuator driver 34 to stop the eye-shaped lens barrel 1.

If the joystick signal indicates a specific position (operation S52), the operation goes to operation S541.

In operation S541, the micro-controller 33 finds out the specific position indicated by the joystick signal. In operation S542, the micro-controller 33 reads the EEPROM 37 to load the movement traces and movement velocities information that correspond to the specific position. In operation S543, the micro-controller 33 controls sends a signal to the driving units such that the actuator driver 34 to rotates the eye-shaped lens barrel 1 according to the loaded information of movement traces and movement velocities. In operation S544, the micro-controller 33 monitors the rotation-position data of the rotation-position sensing unit EN1/EN2/35/36 to determine whether the eye-shaped lens barrel 1 is positioned at the desired specific position. If so, the micro-controller 33 goes to operation S55 where the micro-controller 33 terminates the operation of actuator driver 34 to stop the eye-shaped lens barrel 1. If not, the micro-controller 33 goes back to operation S543.

In operation S56, the micro-controller 33 determines whether a termination signal has been input. If so, the micro-controller 33 ends the control and, if not, micro-controller 33 goes to operation S51 to repeat operations until the termination signal is inputted.

Figure 6:
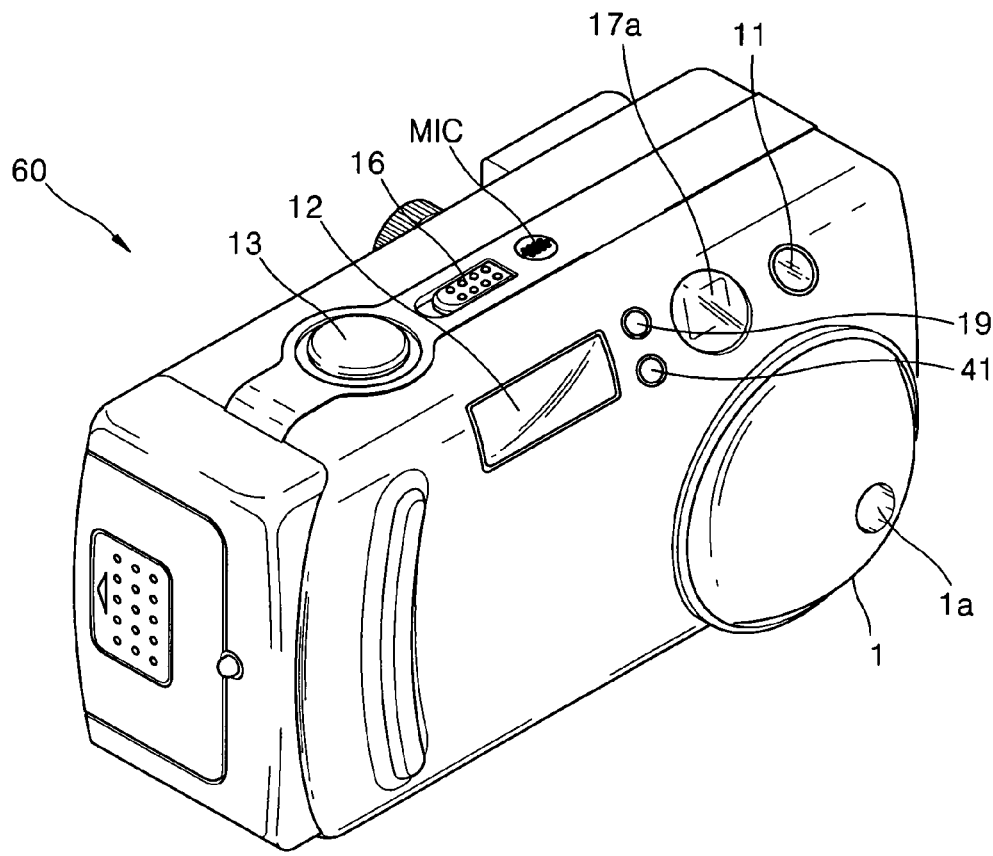
FIG. 6 is a perspective view of a camera with a lens barrel apparatus depicted in FIG. 3.

FIG. 6 is a perspective view of a camera with a lens barrel apparatus depicted in FIG. 3.

Referring to FIG. 6, the eye-shaped lens barrel 1, a microphone MIC, a self-timer lamp 11, a flash 12, a shutter release button 13, a viewfinder 17a, a flash light amount sensor 19, a power switch 16, and a remote control receptor 41 are provided in the front and upper surfaces of a digital camera 60.

In a self-timer mode, the self-timer lamp 11 flickers for a set time. For example, the self-timer lamp 11 flickers from the moment when the shutter release button 13 is pressed and to the moment when the photographing starts. The flash light amount sensor 19 detects the amount of light emitted from the flash 12 and sends it to a main controller (not shown).

The remote control receptor 41 receives an infrared light signal from a remote control (not shown) and sends it to the main controller.

The shutter release button 13 is a two-step button. When the user presses the shutter release button 13 halfway after manipulating a wide angle zoom button 39w (FIG. 7) or a telephoto zoom button 39t (FIG. 7), the shutter button 13 generates a first signal, and when the user presses the shutter button 13 completely, the shutter button 13 generates a second signal.

Figure 7:
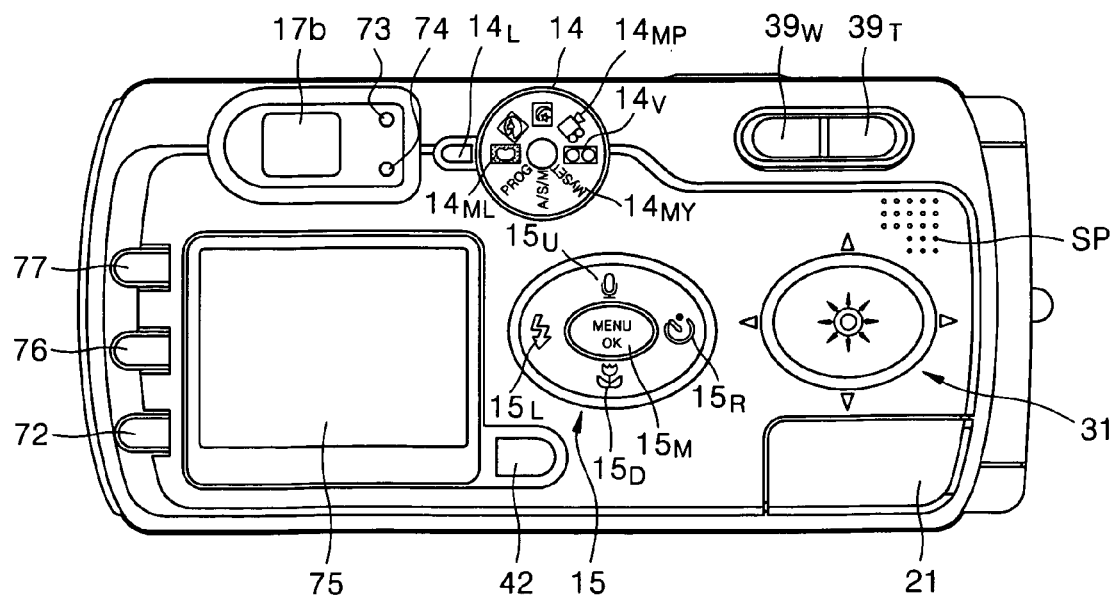
FIG. 7 is a rear view of a camera depicted in FIG. 6.

FIG. 7 is a rear view of a camera depicted in FIG. 6.

Referring to FIG. 7, the joystick 31, a mode dial 14, function selection buttons 15, a manual focus/delete button 76, a manual adjustment/review/end button 77, a review mode button 42, a speaker SP, a monitor button 72, an auto-focus lamp 73, a viewfinder 17b, a flash ready lamp 74, a color liquid crystal display (LCD) panel 75, the wide angle zoom button 39W, the telephoto zoom button 39T, and an external interface portion 21 are arranged on the rear side of the digital camera 60.

The mode dial 14 allows the user to set a variety of modes, for example, a digital effect mode $14_{ML}$, a program mode, a portrait mode, a night scene mode, a manual mode, a movie clip mode $14_{MP}$, a myset mode $14_{MY}$, and a voice recording mode $14_V$.

The digital effect mode $14_{ML}$ allows the user to take a composite picture. That is, the user can add a desired effect or an image when taking a picture. The myset mode 14MY allows the user to save frequently used shooting settings for later use. The voice recording mode $14_V$ allows the user to record sound.

The function selection buttons 15 are used to select one of functions of the digital camera 60, and also used as direction keys to move a curser on the LCD panel 75. The functions selectable with the function selection buttons 15 will now be described.

In a review mode, pressing a self-timer/right button $15_R$ displays the next image on the LCD panel 75, and when the currently displaying image is enlarged, pressing the self-timer/right button $15_R$ displays the right part of the enlarged image. In a preview mode, pressing the self-timer/right button $15_R$ starts a self-timer operation. For example, if self-timer is set to 10 seconds, a picture will be taken in 10 seconds after the self-timer button $15_R$ is pressed in the preview mode.

In the review mode, pressing a flash/left button $15_L$ displays the previous image on the LCD panel 75, and when the currently displaying image is enlarged, pressing the flash/left button $15_L$ displays the left part of the enlarged image.

In the preview mode, pressing the flash/left button $15_L$ allows the user to select one of flash modes for taking a picture.

In the review mode, when a currently displaying image is enlarged, pressing a macro/down button $15_D$ displays the lower part of the enlarged image. In the preview mode, pressing the macro/down button $15_D$ allows the user to select a close-up auto-focus function for taking a picture.

In the review mode, when a currently displaying image is enlarged, pressing a voice-recording/up button $15_U$ displays the upper part of the enlarged image. In the preview mode, pressing a voice-recording/up button $15_U$ allows the user to record sound for 10 seconds after taking a picture.

The user can change from the preview mode to a setting mode. In the setting mode, the user can press a menu/select-confirm button $15_M$ to set a condition according to a highlighted setting.

The user can use the manual adjustment/review/end button 77 to manually adjust camera operating conditions. Also, when a movie clip is selected the user can press the manual adjustment/review/end button 77 to play back the selected movie clip or stop the playback.

In a photographing mode, the user can use the manual focus/delete button 76, for a manual focus adjustment or deletion. The manual adjustment/review/end button 77 is used to manually adjust a specific condition and also used to display a picture and play back a movie clip in the review mode. The review mode button 42 is used to toggle between the review mode and the preview mode.

The monitor button 72 is used to control the operation of the LCD panel 75. For example, when the monitor button 72 is pressed once in the photographing mode, an object to be photographed and a corresponding photographing condition are displayed on the LCD panel 75. When the monitor button 72 is pressed a second time in the same mode, power applied to the LCD panel 75 is cut off. Also, when a stored image is displayed on the LCD panel 72 in the review mode, the first pressing of the monitor button displays corresponding photographing information on the LCD panel 72, and the second pressing of the monitor button 42 displays the image without any other information.

The auto-focus lamp 73 is operated when an object to be photographed is properly focused. The flash ready lamp 74 is operated when the flash 12 in FIG. 6 is ready. A mode lamp $14_L$ indicates a selected mode by the mode dial 14.

As described above, the lens barrel apparatus of the present invention is designed such that the user can rotate the eye-shaped lens barrel 1 about the vertical and horizontal axes by manipulating the joystick of the coordinate input unit. Therefore, the user does not need to change his/her position and posture to direct the camera lens toward a target object. Further, when taking a picture in the self-timer mode, the present invention minimizes the need for the user to specially position the camera to direct its lens toward a target object.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for a camera, comprising:
    a lens barrel; and
    a driving unit, wherein, in response to a signal, the driving unit rotates the lens barrel about an axis; and
    a rotation-position sensing unit that generates rotation-position data for the lens barrel in response to the rotation of the lens barrel, the rotation-position sensing unit comprising:
        encoders that generate analog signals in response to the rotation of the lens barrel;
        an amplifier that amplifies the analog signals of the encoders; and
        an analog-to-digital converter that converts the amplified analog signals into digital signals to generate rotation-position data.

2. The apparatus of claim 1, wherein the lens barrel comprises a cylindrical internal barrel in which a zoom lens, a focus lens, and an optoelectric converter (OEC) are disposed.

3. The apparatus of claim 1, wherein the lens barrel is generally eye-shaped.

4. The apparatus of claim 1, wherein the signal is a vertical rotation control signal, the axis is a vertical axis of the camera and the driving unit rotates the lens barrel about a vertical axis of the camera in response to a vertical rotation control signal.

5. The apparatus of claim 1, wherein the signal is a horizontal rotation control signal, the axis is a horizontal axis of the camera and the driving unit rotates the lens barrel about a horizontal axis of the camera in response to a horizontal rotation control signal.

6. The apparatus of claim 1, further comprising a coordinate input unit that generates input coordinate data according to a user input, wherein the signal is at least partially based on the user input.

7. The apparatus of claim 1, wherein the signal represents data regarding a vertical rotation control signal or a horizontal rotation control signal or both, further comprising:
   a coordinate input unit that generates input coordinate data according to a user input; and
   a controller that generates a vertical rotation control signal and a horizontal rotation control signal according to the input coordinate data from the coordinate input unit and the rotation-position data from the rotation-position sensing unit.

8. The apparatus of claim 1, further comprising a memory that stores a movement trace and a movement velocity of the lens barrel wherein the movement trace and movement velocity are associated with at least one position of the lens barrel.

9. The apparatus of claim 1, further comprising a joystick for receiving user input, wherein the signal is at least partially based on the user input to the joystick.

10. The apparatus of claim 1, further comprising a coordinate input unit that comprises:
    a joystick for generating a joystick analog signal in response to an action of a user; and
    an interface for converting the joystick analog signal of the joystick into input coordinate data, wherein the signal is at least partially based on the user input to the joystick.

11. An apparatus for rotating a camera lens, the apparatus comprising:
    a generally eye-shaped lens barrel;
    a vertical driving unit that rotates the lens barrel about a vertical axis in response to a vertical rotation control signal;
    a horizontal driving unit that rotates the lens barrel about a horizontal axis in response to a horizontal rotation control signal;
    a rotation-position sensing unit that generates rotation-position data of the lens barrel in response to the rotation of the lens barrel, the rotation-position sensing unit comprising:
      encoders that generate analog signals in response to the rotation of the lens barrel;
      an amplifier that amplifies the analog signals of the encoders; and
      an analog-to-digital converter that converts the amplified analog signals into digital signals to generate the rotation-position data;
    a coordinate input unit that generates input coordinate data according to a manipulating action of a user; and
    a controller that generates the vertical rotation control signal and the horizontal rotation control signal according to the input coordinate data from the coordinate input unit and the rotation-position data from the rotation-position sensing unit.

12. The apparatus of claim 11, wherein the coordinate input unit comprises:
    a joystick that generates a joystick analog signal in response to the manipulating action of the user; and
    an interface that converts the joystick analog signal of the joystick into the input coordinate data.

13. The apparatus of claim 11, wherein the vertical driving unit further comprises:
    a vertical axis actuator that rotates the lens barrel about a vertical axis of the camera; and
    an actuator driver that controls the movement of the vertical axis actuator in response to a vertical rotation control signal.

14. The apparatus of claim 11, wherein the lens barrel comprises a cylindrical internal barrel in which a zoom lens, a focus lens, and an optoelectric converter (OEC) are disposed.

15. The apparatus of claim 11, further comprising a memory that stores a movement trace and a movement velocity of the lens barrel wherein the movement trace and movement velocity are associated with at least one position of the lens barrel.

16. The apparatus of claim 11, wherein the horizontal driving unit further comprises:
    a horizontal axis actuator that rotates the lens barrel about the horizontal axis; and
    an actuator driver that controls the movement of the horizontal axis actuator in response to the horizontal rotation control signal.

17. A method of rotating a camera lens, the method comprising:
    generating digital rotation-position data of a lens barrel in response to the rotation of the lens barrel;
    receiving user input from a joystick;
    generating input coordinate data according to the user input;
    generating a signal according to the input coordinate data and the rotation-position data; and
    rotating the lens barrel about an axis in response to the signal.

* * * * *